US006463769B1

(12) United States Patent
Garner

(10) Patent No.: US 6,463,769 B1
(45) Date of Patent: Oct. 15, 2002

(54) LOCK BOX APPARATUS FOR A PADLOCK

(76) Inventor: John J. Garner, 903 E. Redfield Rd., Phoenix, AZ (US) 85022

( * ) Notice: Subject to any disclaimer, the term of this patent is extended or adjusted under 35 U.S.C. 154(b) by 0 days.

(21) Appl. No.: 09/617,831

(22) Filed: Jul. 17, 2000

(51) Int. Cl.[7] ............................ B60D 1/60; E05B 67/38
(52) U.S. Cl. .............................. 70/56; 70/203; 292/205
(58) Field of Search .............................. 70/56, 203, 14, 70/232, 100; 292/205, 148, 281, 327, DIG. 2; 280/507

(56) References Cited

U.S. PATENT DOCUMENTS 4,567,740 A * 2/1986 Kelly ............................ 70/55
4,972,689 A * 11/1990 Anderson ...................... 70/56
5,118,149 A * 6/1992 Emmons ..................... 292/327
5,172,574 A * 12/1992 Perfetto ......................... 70/56
5,410,893 A * 5/1995 Easterwood ................... 70/14
5,743,118 A * 4/1998 Anderson ...................... 70/56

* cited by examiner

*Primary Examiner*—Tan Nguyen
*Assistant Examiner*—Dalena Tran
(74) *Attorney, Agent, or Firm*—H. Gordon Shields

(57) ABSTRACT

Housing apparatus for protecting a padlock includes plate elements securable to a door with an aperture in the back of the housing for receiving a fixed hasp plate secured either to a second door or to a door frame. The housing includes a slot in a back plate for receiving the hasp plate and an open bottom for receiving a padlock. A front plate includes an aperture through which a key may be extended into a front opening padlock.

6 Claims, 1 Drawing Sheet

LOCK BOX APPARATUS FOR A PADLOCK

BACKGROUND OF THE INVENTION

1. Field of the Invention

This invention relates to protective housing for a padlock and, more particularly to a lock box for enclosing a padlock and protecting the padlock from being cut with bolt cutters and the like.

2. Description of the Prior Art

U.S. Pat. No. Des. 378,189 (Small et al) discloses a protective padlock guard. The apparatus includes a flange adjacent to a padlock and disposed over the padlock.

U.S. Pat. No. 4,068,505 (Volk, Jr.) discloses another type of shield for a padlock. The apparatus includes a plate which fastens over the padlock.

U.S. Pat. No. 4,896,518 (Appelgren) discloses a box arrangement for protecting a padlock. The boxlike apparatus includes slots which cooperate with the lock and a hasp. There is also a plate on the housing which provides the actual protection for the padlock.

U.S. Pat. No. 4,905,486 (Appelbaum) discloses a pivoting plate elements which include a double lock system. That is, the pivoting plate elements include a built-in lock, and the plate elements comprise a housing for a padlock.

U.S. Pat. No. 5,216,903 (Chen) discloses a padlock which includes a concealed shackle. The padlock itself includes its own protective plate to prevent access to the shackle of the lock.

U.S. Pat. No. 5,261,258 (Bunger) discloses a relatively complicated housing for preventing access to the shackle of a padlock.

U.S. Pat. No. 5,303,568 (Wightman) discloses a padlock protector apparatus which includes a pair of spaced apart parallel plates which are disposed on opposite sides of a padlock shackle to prevent access to the shackle.

U.S. Pat. No. 5,307,653 (Davis) discloses security apparatus which includes a slide bolt and an external keyed element. The apparatus requires a key to remove a plate which covers the padlock. The apparatus essentially comprises a double lock system. The slide bolt is secured by the padlock, and a plate the covers the shackle of the padlock. The plate includes an integral lock in order to move the plate.

U.S. Pat. No. 5,737,946 (Sole et al) discloses a shield assembly for a semi-trailer door latch. The apparatus includes plate elements extending in different directions and which prevent access to the padlock. The plate elements also prevent access to a latch handle of the semi-trailer door.

U.S. Pat. No. 5,924,314 (Cernansky) discloses a housing for protecting a padlock. The apparatus includes an elongated tube which is disposed over a slide bolt latch. The tube slides and latches to provide access in one direction and to prevent access in the opposite direction to a padlock.

The apparatus of the present invention provides a simpler and less expensive housing for receiving a padlock and for preventing access to the padlock. The padlock for which the present apparatus is designed is one with a front key system rather than a padlock with a bottom key system.

SUMMARY OF THE INVENTION

The invention described and claimed herein comprises a housing which is appropriately secured, as by welding, to one door of a pair of doors or to a single door of cooperating elements either on a second door or on a door frame. The housing includes an opening in the back for receiving a loop secured to either the second door or door frame and an aperture in the front of an apparatus for inserting a key for the lock. The padlock, with its front key receiving aperture, is inserted through the loop from the bottom. The: padlock is thus completely enclosed by the housing, with access to the lock key away from the front of the housing.

Among the objects of the present invention are the following:

To provide new and useful protective apparatus for a padlock;

To provide new and useful housing for a padlock;

To provide new and useful housing apparatus for enclosing a padlock;

To provide protective apparatus securable to a door and for cooperating with a fixed hasp secured to a second door or to a door frame; and To provide new and useful housing apparatus for protecting a front locking padlock.

DESCRIPTION OF THE PREFERRED EMBODIMENT

Figure 1:
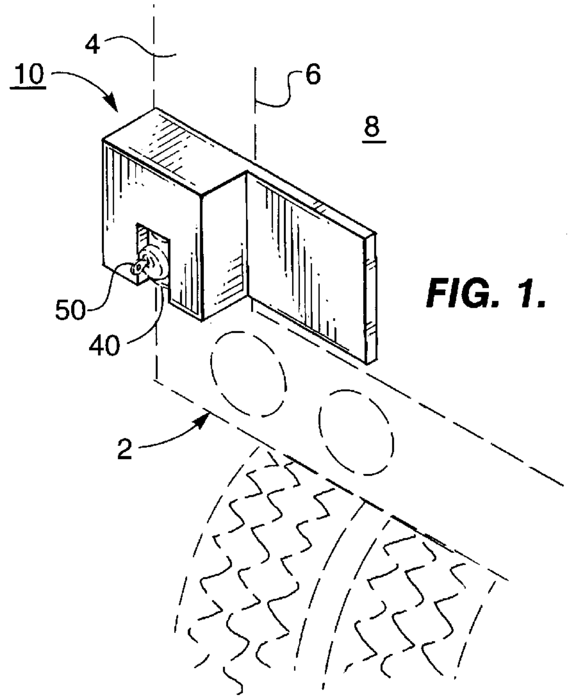
FIG. 1 is a perspective view of the apparatus of the present invention in a use environment.
Figure 2:
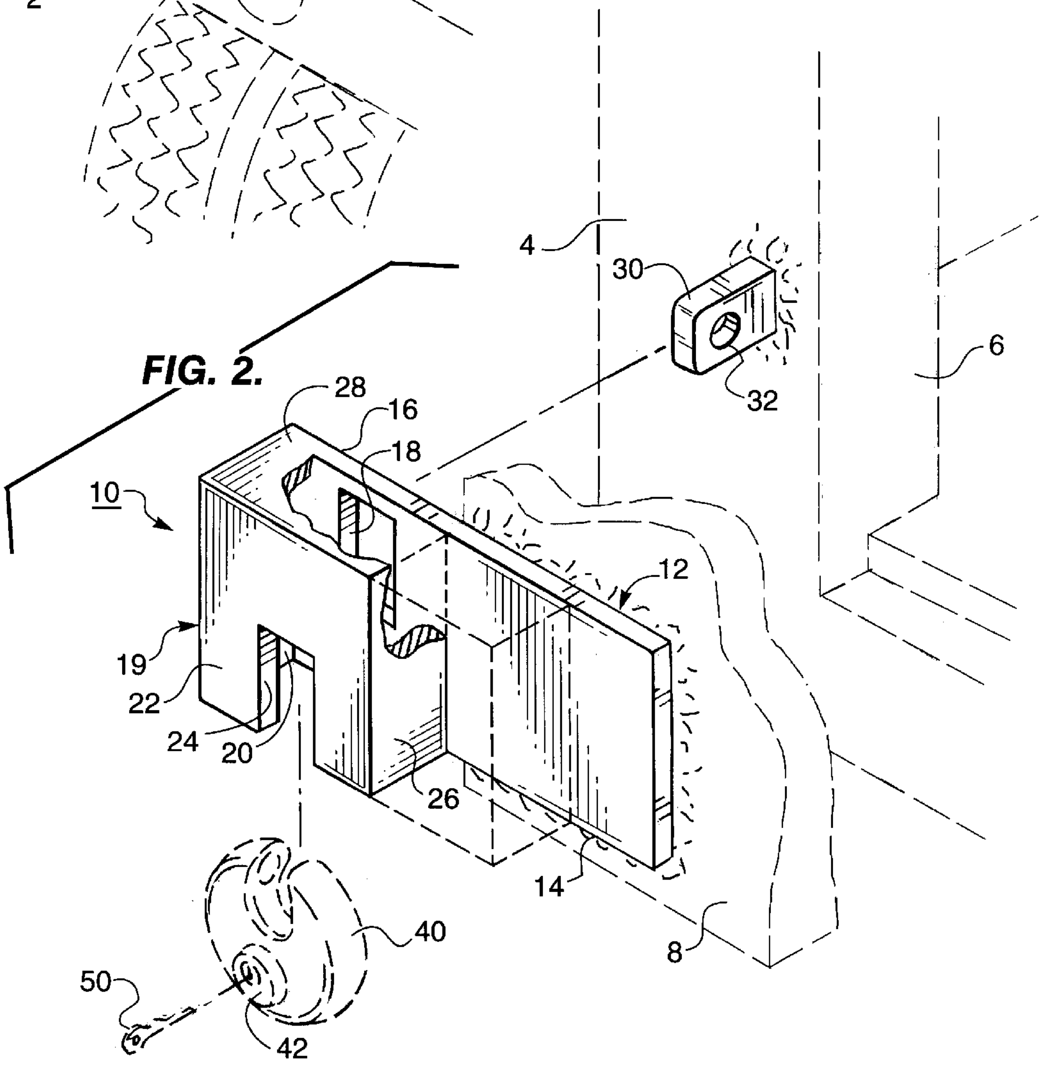
FIG. 2 is an exploded perspective view, partially broken away, of the apparatus of the present invention in the environment of FIG. 1.

FIG. 1 is a perspective view illustrating the lock box apparatus 10 of the present invention in a use environment. The use environment includes a truck 2 with a side post 4 and a door 8. The lock box protective apparatus 10 is secured to the door 8 and cooperates with elements secured to the side post 4. The protective nature is best illustrated in FIG. 2. FIG. 2 comprises an exploded, perspective view, partially broken away, of the apparatus 10 in the environment illustrated in FIG. 1. For the following discussion, reference will be made to both FIGS. 1 and 2.

The apparatus 10 includes a plate 12 which is appropriately secured, as by welding, to the door 8.

The plate 12 is divided into two portions, a door portion 14 and an housing portion 16. The door portion 14 is appropriately secured, as by welding, to the door 8. The housing portion 16 extends beyond the door 8 and overlaps the side post 4. A padlock housing or box 19 is secured to the housing portion 16. The housing portion 16 becomes a back wall of the housing or box 19.

Extending through the housing portion 16 is an aperture 18. The purpose of the aperture 18 will be discussed in detail below.

Extending outwardly from the housing portion 16 is a side plate 20. The side plate 20 is substantially perpendicular to the housing portion 16 of the plate 12.

Spaced apart a relatively short distance from the housing portion 16 is a front plate 22. The front plate 22 is appropriately secured to the side plate 20, just as the side plate 20 is appropriately secured to the housing portion 16 of the plate 12. A slot 24 extends upwardly from the bottom of the front plate 22. The front plate 22 is substantially parallel to the housing portion 16 of the plate 12.

A second side plate 26 is appropriately secured to the front plate 22 and to the housing portion 16 of the plate 12. The side plate 26 is generally parallel to the side plate 20, but obviously spaced apart from it. The housing or box portion is then closed by a top plate 28. The top plate 28 is secured to both the back plate 12, the side plates 20 and 26, and the front plate 22. Thus, the box or housing or enclosure 19 is open only at the bottom. The plates 20, 22, 26, together with the plate portion 16, comprise walls of the housing or box or enclosure 19 for a padlock, with the plate 28 comprising a top wall. The bottom of the box 19 is open to receive a padlock.

A lock plate or fixed hasp plate 30 is appropriately secured, as by welding, to the side post 4. The plate 30 includes an aperture 32 which extends through the plate. The plate 30 is substantially perpendicular to the side post 4 and, when the door 8 is closed, the lock plate 30 extends through the aperture 18 in the housing portion 16 of the plate 12 and into the interior of the box or housing 19.

In FIG. 2, a padlock 40 is shown spaced apart below the housing 19. With the door 8 closed, and the fixed hasp plate 30 extending through the aperture 18, the padlock 40 may be inserted upwardly through the open bottom of the housing 19 and the shackle of the padlock 40 may then be inserted through the aperture 32 in the hasp plate. The slot 24 in the front wall or plate 22 provides access for a key 50 to be inserted into a front key slot 42 of the padlock 40. With the key 50 removed from the lock, and the lock 40 in place, the padlock 40 is protected by the box apparatus 10 so as to prevent access to the padlock 40 for the use of a bolt cutter, or the like, on the shackle of the padlock 40.

It will be noted that the padlock 40 is of the "Buffalo" type, in which the padlock 40 is generally circular with a relatively short, curved shackle and a front key slot or keyway 42. This type of padlock is particularly advantageous in the circumstances in which the apparatus 10 is employed.

It will be understood that the apparatus 10 is preferably made of relatively thick steel for maximum protection, thus rendering it very difficult for a would-be thief to interfere with the lock system.

It will be noted that a single door has been discussed and illustrated. However, it is obvious that the apparatus 10 may also be employed with double doors. In such case, the plate 12 is secured to one door and the hasp plate 30 is secured to the second door.

Moreover, while a front keyed padlock is illustrated, it is obvious that a bottom keyed padlock may also be used. In such case, the housing 19 may need to be elongated by lengthening the plate 22 and spacing apart the plate 26 a greater distance from the plate 20, as shown by the dashed line in FIG. 2.

While the principles of the invention have been made clear in illustrative embodiments, there will be immediately obvious to those skilled in the art many modifications of structure, arrangement, proportions, the elements, materials, and components used in the practice of the invention, and otherwise, which are particularly adapted to specific environments and operative requirements without departing from those principles. The appended claims are intended to cover and embrace any and all such modifications, within the limits only of the true spirit and scope of the invention.

What I claim is:

1. Housing apparatus for a padlock comprising in combination:

- a first plate divided into two portions, a first portion adapted to be secured to a door and a second portion extending outwardly beyond the door and comprising a back wall;
- a second and third plate comprising a pair of plates and defining end walls spaced apart from each other and secured to the first plate;
- a fourth plate spaced apart from the first plate and secured to the pair of plates and comprising a front wall;
- a fifth plate secured to the first plate, the pair of plates, and the fourth plate, and comprising a top wall;
- a hasp plate adapted to be secured to a side post when the apparatus is used with a single door or to another door when the apparatus is used with double doors;
- an aperture in the hasp plate adapted to receive a shackle of a padlock; and
- an aperture in the second portion of the first plate for receiving the hasp plate.

2. The apparatus of claim 1 which further includes a slot in the fourth plate adapted to receive a key when the padlock has a front key slot.

3. The apparatus of claim 1 in which the pair of plates is secured to the second portion of the first plate.

4. Housing apparatus for a padlock comprising in combination:

- a first plate having a first portion adapted to be secured to a door and a second portion extending outwardly beyond the door and comprising a back wall;
- a second plate secured to the second portion of the first plate and extending outwardly substantially perpendicularly thereto;
- a third plate spaced apart from the second plate and disposed substantially parallel thereto and secured to the first plate, the second and third plates comprising end walls;
- a fourth plate secured to second and third plates and comprising a front wall;
- a fifth plate secured to the first, second, third, and fourth plates and comprising a top wall;
- a fixed hasp plate adapted to be secured to a door post when the apparatus is used with a single door and adapted to be secured to a second door when the apparatus is used with two doors;
- an aperture in the fixed hasp plate adapted to receive the shackle of a padlock; and
- an aperture in the second portion of the first plate for receiving a portion of the hasp plate when the padlock is to be disposed in the housing apparatus.

5. The apparatus of claim 4 in which the forth plate includes a slot for receiving a key when the padlock has a front key slot.

6. The apparatus of claim 4 in which the third plate is secured to the second portion of the first plate.

* * * * *